United States Patent
Kondo et al.

(10) Patent No.: US 7,755,663 B2
(45) Date of Patent: Jul. 13, 2010

(54) IMAGE SIGNAL PROCESSING DEVICE AND METHOD, AND IMAGE SIGNAL PROCESSING SYSTEM

(75) Inventors: Tetsujiro Kondo, Tokyo (JP); Yoshinori Watanabe, Kanagawa (JP)

(73) Assignee: Sony Corporation, Tokyo (JP)

( * ) Notice: Subject to any disclaimer, the term of this patent is extended or adjusted under 35 U.S.C. 154(b) by 1386 days.

(21) Appl. No.: 10/525,634

(22) PCT Filed: Aug. 22, 2003

(86) PCT No.: PCT/JP03/10652

§ 371 (c)(1), (2), (4) Date: Feb. 24, 2005

(87) PCT Pub. No.: WO2004/019611

PCT Pub. Date: Mar. 4, 2004

(65) Prior Publication Data

US 2006/0152587 A1 Jul. 13, 2006

(30) Foreign Application Priority Data

Aug. 26, 2002 (JP) ............................. 2002-245615

(51) Int. Cl.
  *H04N 5/228* (2006.01)
(52) U.S. Cl. .................. 348/208.1; 348/155; 348/208.3
(58) Field of Classification Search .............. 348/208.3, 348/222.1, 143, 155, 208.99, 208.1, 208.4
  See application file for complete search history.

(56) References Cited

U.S. PATENT DOCUMENTS

| 5,267,034 | A | * | 11/1993 | Miyatake et al. | ............. 348/352 |
| 5,809,202 | A | * | 9/1998 | Gotoh et al. | .................. 386/69 |
| 6,678,328 | B1 | * | 1/2004 | Kondo et al. | ........... 375/240.16 |

FOREIGN PATENT DOCUMENTS

| JP | 6-165107 | | 6/1994 |
| JP | 11-225310 | | 8/1999 |
| JP | 11-282442 | | 10/1999 |
| JP | 11282442 | A * | 10/1999 |
| JP | 2002-199333 | | 7/2002 |

* cited by examiner

*Primary Examiner*—Tuan Ho
(74) *Attorney, Agent, or Firm*—Frommer Lawrence & Haug LLP; William S. Frommer; Thomas F. Presson

(57) ABSTRACT

In an image signal processor, a camera operation estimating part detects a movement vector of an input image in order to estimate, for example, a panning operation in a horizontal direction, a tilting operation in a vertical direction, or a zooming operation such as zooming-in or zooming-out. An image output part reads a particular image signal before and after a camera operation from image signals stored in an image storage memory. The particular image signal is then outputted and displayed on a display means. Further, when there is a plurality of display means, an image before and after the camera operation and an image that is currently broadcast are displayed separately on each of the plurality of display means.

29 Claims, 19 Drawing Sheets

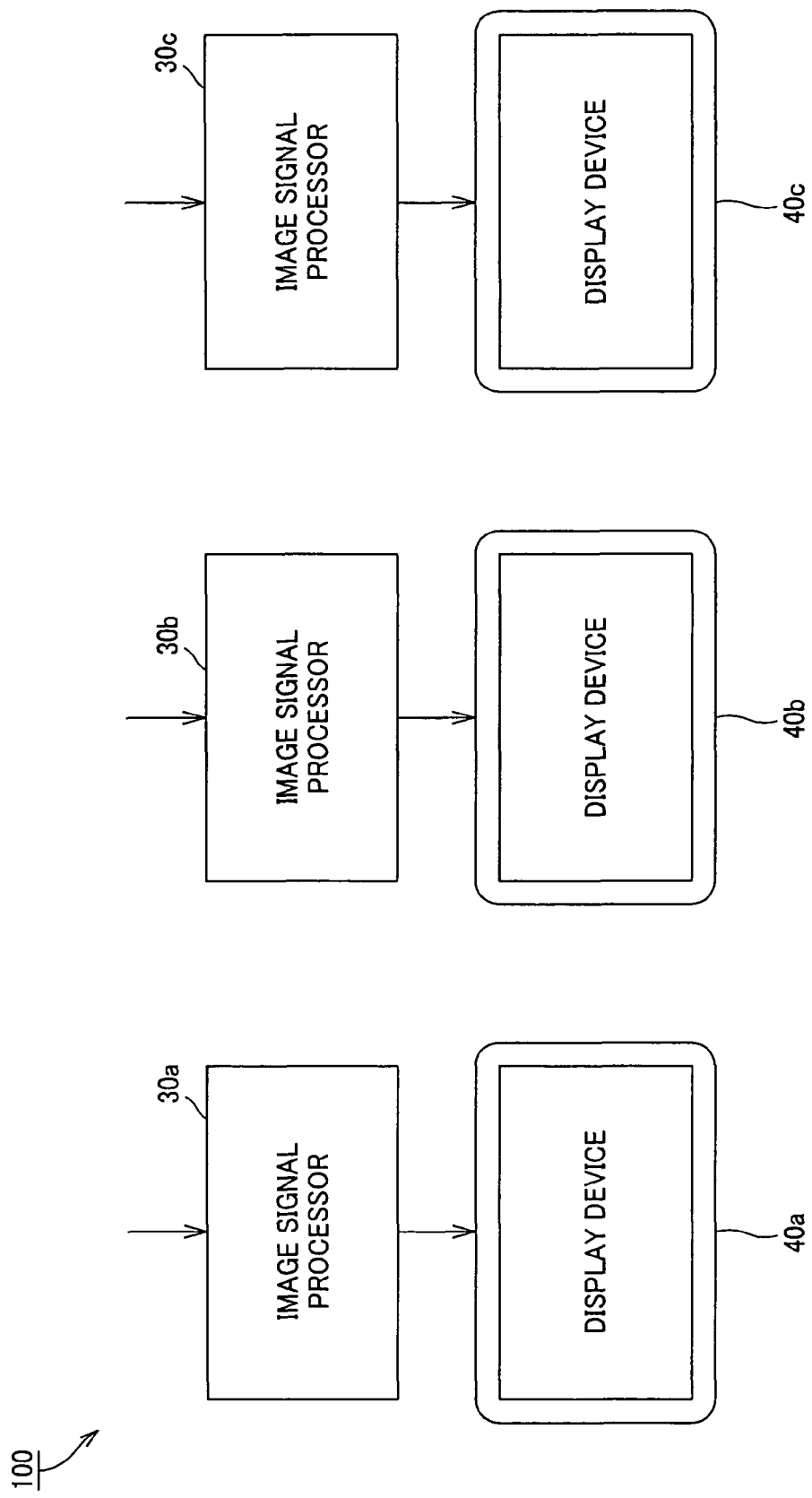

IMAGE SIGNAL PROCESSING DEVICE AND METHOD, AND IMAGE SIGNAL PROCESSING SYSTEM

TECHNICAL FIELD

The present invention relates to an image signal processor, an image signal processing method, a program and a recording medium, and an image signal processing system for extracting and displaying an important image from an image that is broadcast by a television, or the like.

This application claims a priority based on Japanese Patent Application No. 2002-245615 filed in Aug. 26, 2002 in Japan, which is applied to this application by referring thereto.

BACKGROUND ART

As a method for forming digest images of moving images, a method has been usually known that frames are equally dropped and displayed by, for instance, the quick feed reproduction of a VTR or a display speed is manually adjusted by using a variable speed reproduction such as a jog shuttle dial or the like.

Further, as a method for forming a digest edition of a television program or the like, Japanese Patent Application Laid-Open No. hei 3-90968 proposes a technique that an editor previously views images to decide a priority such as a degree desired to be preferentially displayed for each of frames of the images and a degree desired to be displayed in a digest for a long time or the like, and allocates the priority to each of the frames to obtain the digest edition within a designated time.

However, in the quick feed reproduction, the frames are equally dropped irrespective of the contents of the images, so that necessary frames have been undesirably dropped out. On the contrary, unnecessary frames have been inconveniently displayed. Further, in the variable speed reproduction such as the jog shuttle dial, the images can be displayed at speed adapted to the interest or the degree of understanding of a user (a viewer). However, all of the moving images have needed to be undesirably edited by a manual operation for a long time.

Further, in the method that the editor previously views the images and allocates a priority to each of the frames to form the digest images, considerable time and labor have been disadvantageously needed for an operation for forming the digest images.

Thus, Japanese Patent Application Laid-Open No. hei 6-165009 proposes a technique that the states of images are estimated from input signals of buttons such as start/end of image recording, zooming, fading, focusing, exposure, white balance, shutter speed, etc., which are employed upon photographing and priorities corresponding to the states are set to select display images or display speed and thus form digest images.

According to this technique, the digest images representing the intention of photographing can be formed without previously allocating the priorities or manually operating the priorities upon displaying a digest.

However, according to the technique disclosed in the Japanese Patent Application Laid-Open No. hei 6-165009, the priority showing the importance of an image is selected and calculated from the input signal of a zooming button or the like to form the digest images during picking up images by an image pick-up device such as a video camera. The digest images are not formed from images broadcast by, for instance, a television.

Therefore, this technique meets a purpose that an editor grasps the contents of moving images for a short time, however, cannot meet the request of an ordinary user (a viewer) who desires to view important images for a long time, or desires to prevent the important images from being overlooked, separately from the images broadcast by the television.

DISCLOSURE OF THE INVENTION

The present invention is proposed by considering the above-described circumstances and it is an object of the present invention to provide an image signal processor, an image signal processing method, a program and a recording medium, and an image signal processing system for extracting and displaying important images representing the intention of a photographer from images broadcast by a television, or the like.

For achieving the above-described object, in an image signal processor and an image signal processing method according to the present invention, an image signal is inputted to detect a movement thereof, the start time and/or the completion time of a camera operation are estimated from the detected movement and the image signal at the estimated start time and/or the estimated completion time of the camera operation is extracted and outputted.

Here, the inputted image signal can be outputted together with the extracted image signal. In this case, a synthesized image obtained by synthesizing the extracted image signal with the inputted image signal can be also outputted.

Further, in the image signal processor and the image signal processing method, the synthesized image may be displayed on a display means.

In such an image signal processor and an image signal processing method, the movement of an inputted image is detected, the start time and/or the completion time of a camera operation upon shooting are estimated from the detected movement and an image before and after the camera operation is synthesized with the input image to display the synthesized image on a display means.

Further, a program according to the present invention serves to perform the above-described image signal process by a computer and a recording medium is a medium on which the program capable of being read by the computer is recorded.

Further, in order to achieve the above-described object, an image signal processing system comprises: an image signal processor including a movement detecting means for inputting an image signal to detect the movement thereof, and a camera operation estimating means for estimating a start time and/or a completion time of a camera operation from the movement detected by the movement detecting means and extracting the image signal at the estimated start time and/or the estimated completion time of the camera operation; and a plurality of display devices for displaying the inputted image signal and the extracted image signal.

Here, the image signal processor can control an image signal displayed on each of the display devices among the extracted image signals in accordance with the arrangement of the plurality of display devices.

In the above-described image signal processing system, the image signal processor detects the movement of the inputted image signal, estimates the start time and/or the completion time of the camera operation upon shooting from this movement and displays the image before and after the camera operation and the input image on the plurality of display devices.

BRIEF DESCRIPTION OF THE DRAWINGS

FIGS. 5A and 5B show parallel movements and FIGS. 5C and 5D show radial movements.

FIG. 9A shows the image at the time of start of a panning operation. FIG. 9B shows the image at the time of completion of a panning operation.

FIG. 10A shows the image at the time of start of a zooming-in operation and FIG. 10B shows the image at the time of completion of a zooming-in operation.

FIG. 11 shows a diagram for explaining the schematic structure of a distributed type image signal processing system in this embodiment.

FIG. 18A shows an interior arrangement and FIG. 18B shows a parallel arrangement.

BEST MODE FOR CARRYING OUT THE INVENTION

Figure 1:
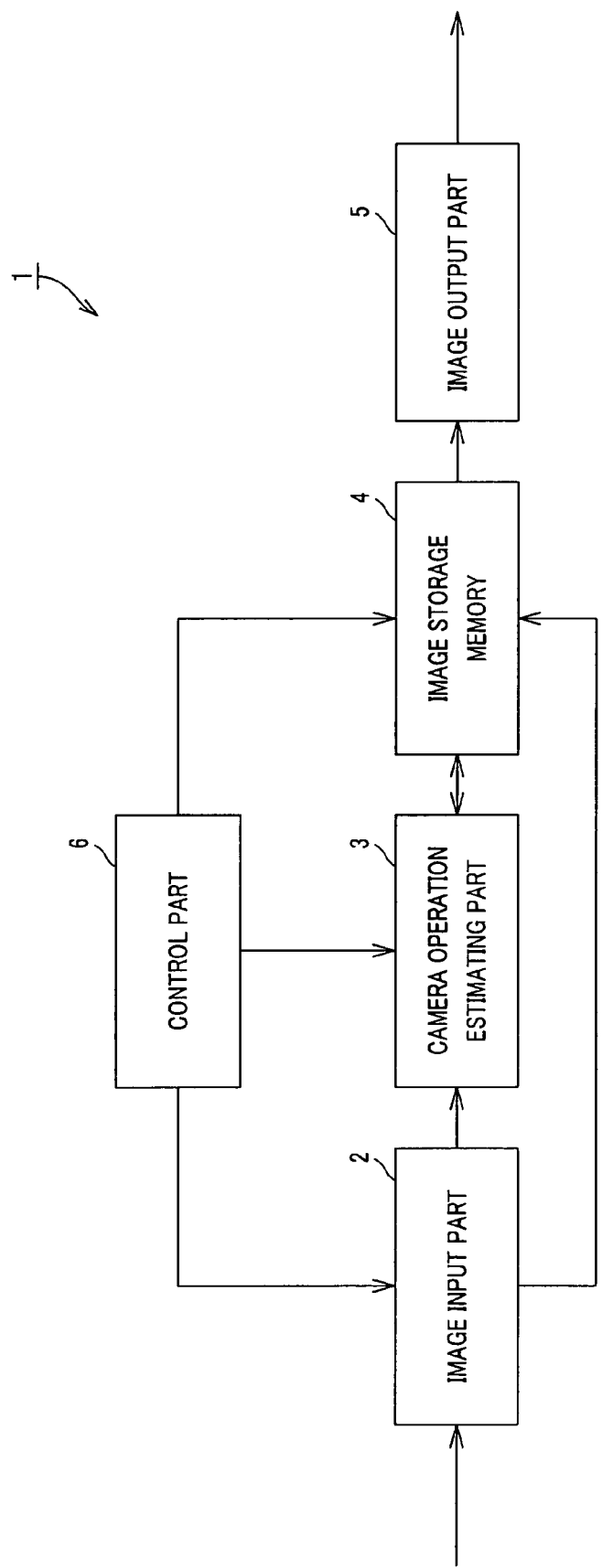
FIG. 1 is a diagram showing one example of a schematic structure of an image signal processor in an embodiment.

Now, a specific embodiment to which the present invention is applied will be specifically described below by referring to the drawings. In this embodiment, the present invention is applied to an image signal processor in which an important image representing the intention of a photographer is extracted from images broadcast by a television, the important image is synthesized with an input image and the synthesized image is displayed on one display device, and an image signal processing system in which a plurality of display devices are provided to display the input image or the extracted important image on the plurality of the display devices.

Initially, one example of the schematic structure of the image signal processor according to this embodiment is shown in FIG. 1. As shown in FIG. 1, the image signal processor 1 in this embodiment includes an image input part 2 for inputting, for instance, a television image signal, a camera operation estimating part 3 for estimating a camera operation such as panning, tilting, zooming, etc., upon shooting from the input image signal obtained by the image input part 2, an image storage memory 4 for storing the input image signals, an image output part 5 for reading an important image signal from the image signals stored in the image storage memory 4 and outputting an image from the read signal, and a control part 6 for controlling each part of the image signal processor 1.

Figure 2:
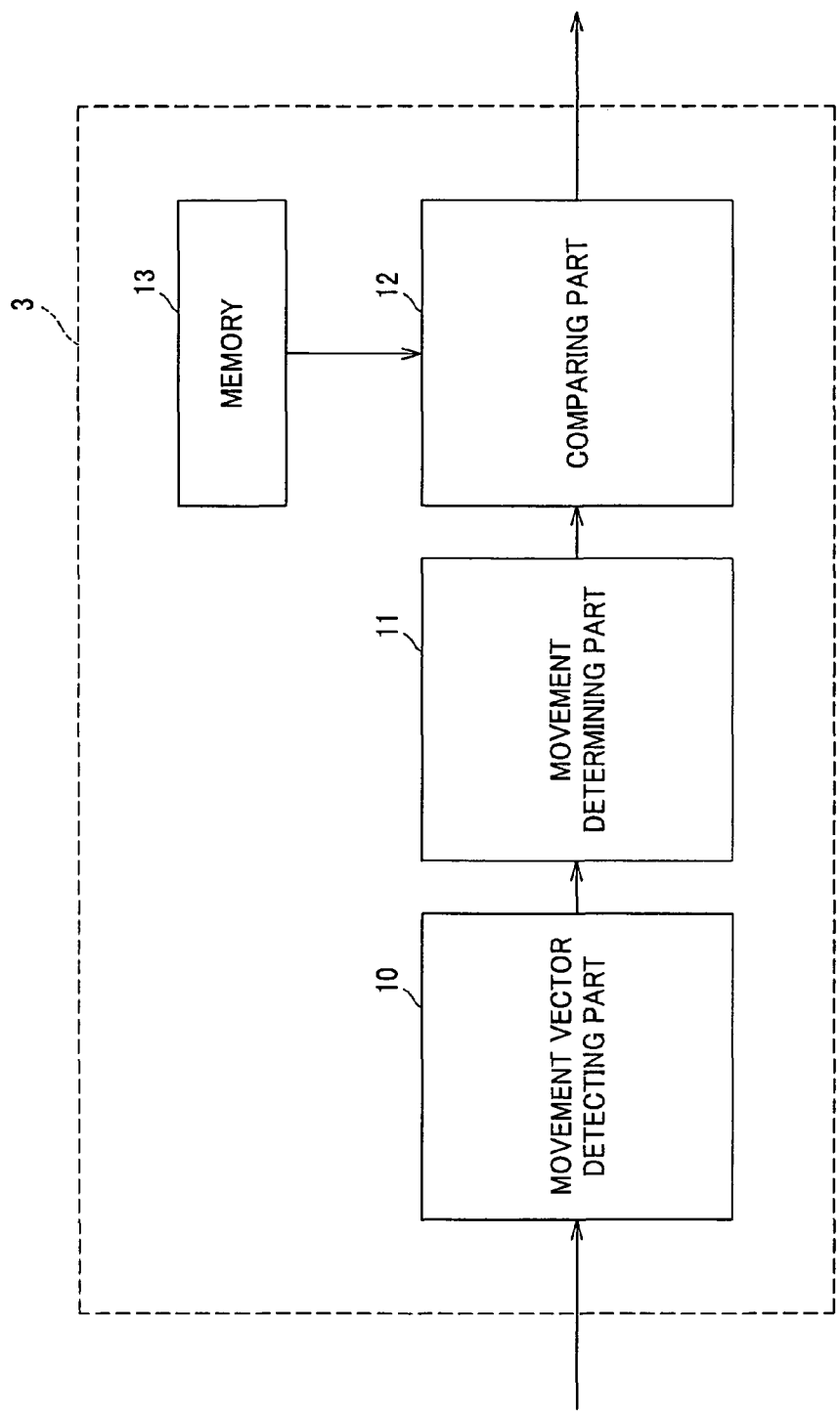
FIG. 2 is a diagram showing one example of a schematic structure of a camera operation estimating part of the image signal processor.

Further, one example of the schematic structure of the camera operation estimating part 3 in the image signal processor 1 is shown in FIG. 2. As shown in FIG. 2, the camera operation estimating part 3 includes a movement vector detecting part 10 for detecting a movement vector from the inputted image signal, a movement determining part 11 for obtaining the movement of the image signal, that is, the movement of the camera operation on the basis of the detected movement vector, and a comparing part 12 for comparing the above-described movement of the camera operation with the movement of a lastly detected image signal stored in a memory 13, in other words, the movement of a lastly detected camera operation to instruct the memory 13 to extract the input image signal when the movement of the image signal is estimated to be a movement at the time of start of the camera operation and/or at the time of completion of the camera operation.

Figure 3:
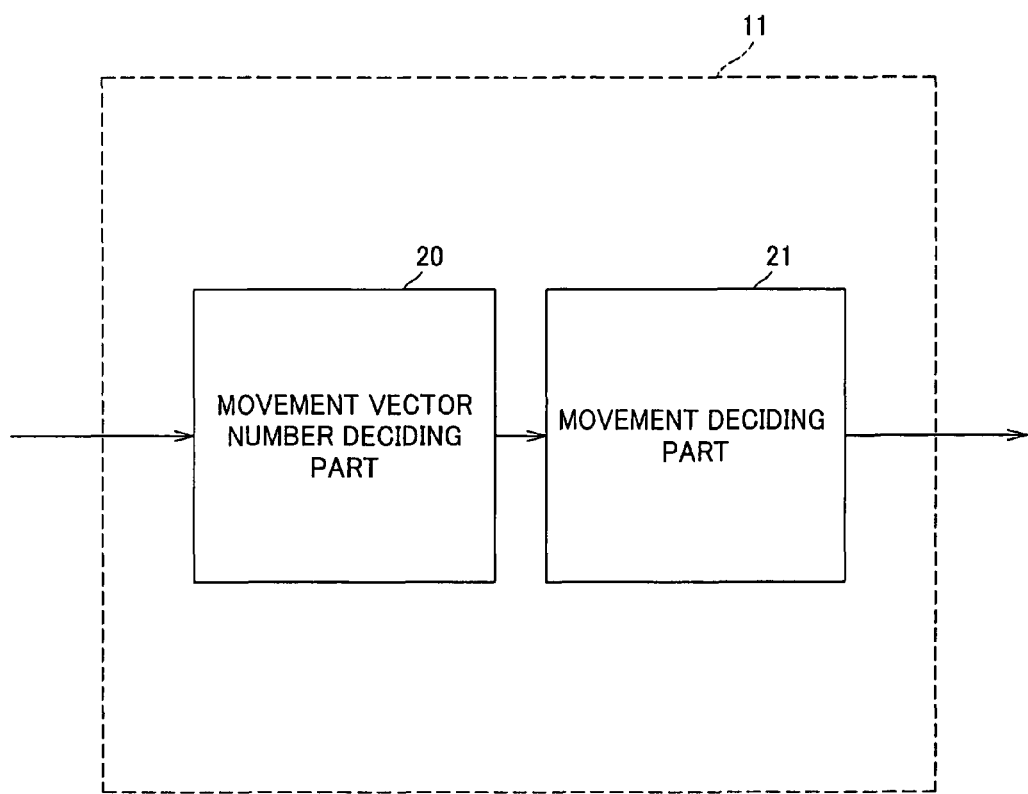
FIG. 3 is a diagram showing one example of a schematic structure of a movement determining part of the camera operation estimating part.

One example of the schematic structure of the movement determining part 11 of the camera operation estimating part 3 is shown in FIG. 3. As shown in FIG. 3, the movement determining part 11 includes a movement vector number deciding part 20 for deciding a movement vector number in each direction of a movement vector obtained from the inputted image signal and a movement deciding part 21 for deciding the movement of the input image signal, that is, the movement of the camera operation on the basis of the decided movement vector number.

Figure 4:
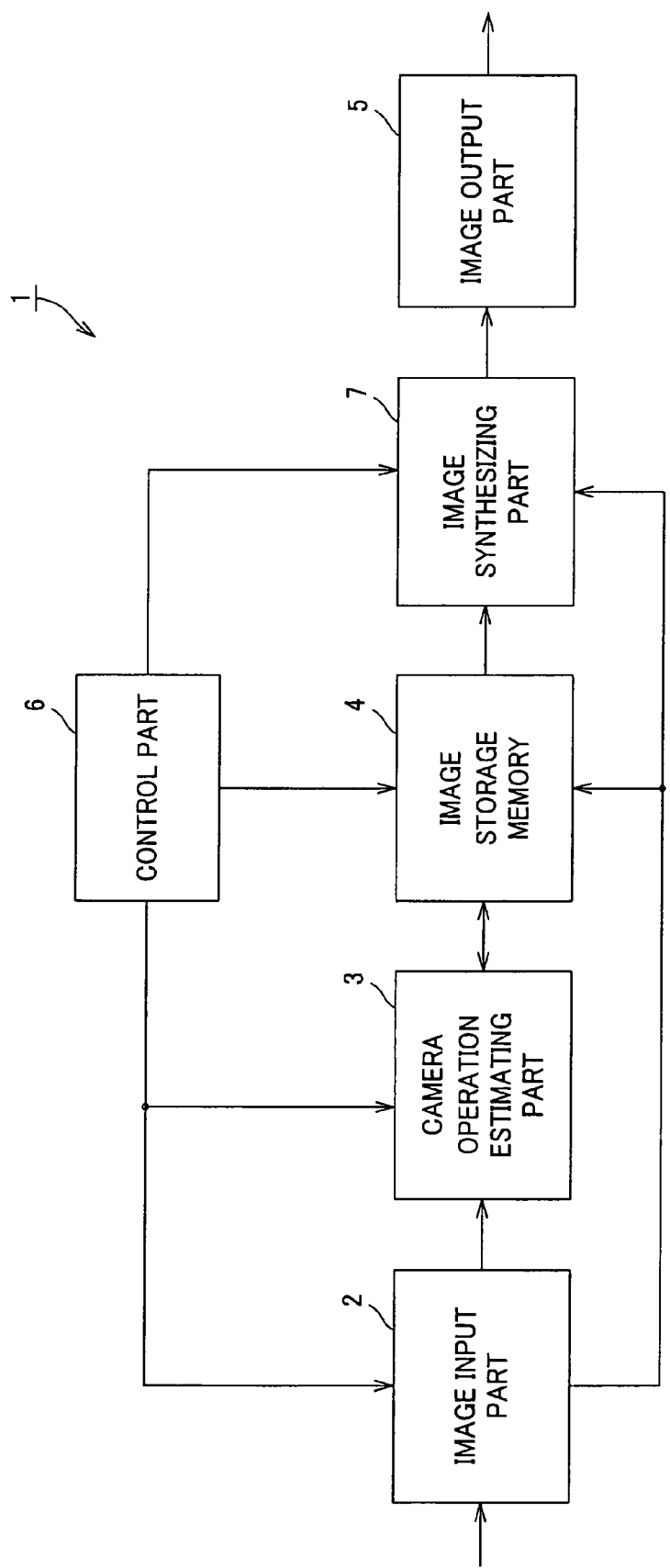
FIG. 4 is a diagram showing another example of a schematic structure of the image signal processor in this embodiment.

Further, in the image signal processor 1 in this embodiment, as shown in FIG. 4, the important image signal may be read from the image signals stored in the image storage memory 4, the read image may be synthesized with the input image by an image synthesizing part 7 and the obtained synthesized image may be outputted from an image output part 5.

When an image for a television broadcasting is picked up, in order to express an expansion of a space, a camera is panned or tilted respectively in a horizontal direction and a vertical direction. In order to adjust an angle of view in a shooting range, the camera is zoomed in or zoomed out. In this embodiment, the above-described camera operation is obtained from the input image to estimate the intention of a photographer.

Specifically, when the camera is panned or tilted, any key object is frequently included in images at the time of start of a movement and at the time of completion of a movement. Further, an entire image can be grasped from, for instance, an image before a zooming-in operation, and the key object can be carefully watched from an object after the zooming-in operation. Accordingly, these images may be considered to be more important than an image during the zooming-in operation.

The image signal processor 1 in this embodiment extracts the important images and synthesizes the important images with, for instance, the input image to display the synthesized image on a display means that is not illustrated. Thus, a viewer can easily grasp a shot space and can be prevented from overlooking the images considered to be important.

Thus, the above-described camera operation estimating part 3 refers to frame images stored in the image storage memory 4 to detect the movement vector of the input image and estimate, for instance, a panning operation in the horizontal direction, a tilting operation in the vertical direction, a zooming operation such as a zooming-in operation, a zooming-out operation, etc. from the movement vector. As a method for detecting the movement vector, for instance, a gradient method, a block matching method, etc. may be exemplified.

When a subject to be shot moves without the camera operation upon shooting, the movement vector is detected. In this embodiment, however, only a case that most of the movement vectors in the image are directed in the same direction, or only a case that the movement vectors in the image are distributed in radial directions is detected. Thus, only a case that the camera operation is carried out is detected separately from the movement of the subject to be shot.

Figure 5A:
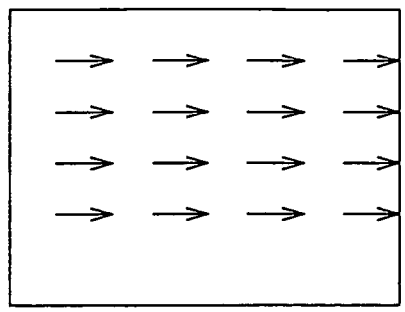
FIGS. 5A to 5D are schematic diagrams showing one example of movement vectors of an input image detected when a camera operation is performed.
Figure 5B:
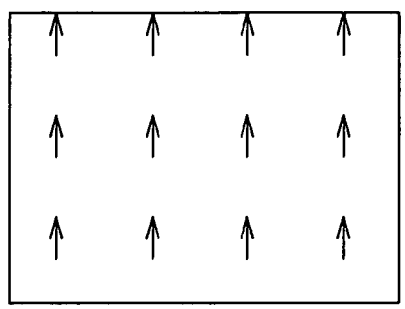
Figure 5C:
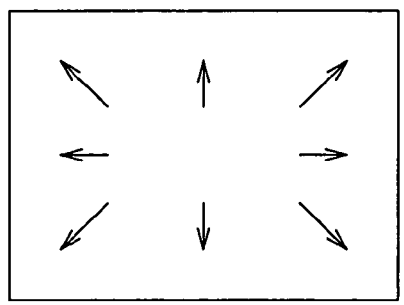
Figure 5D:
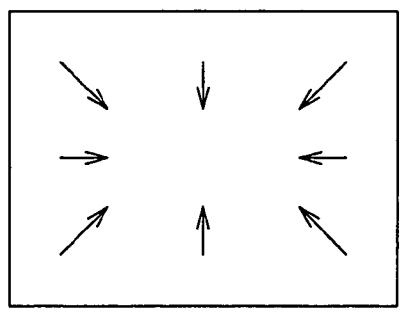

One example of the movement vectors of the input image detected when the above-described camera operations are performed is shown in schematic diagrams of FIGS. 5A to 5D. The movement vectors in the input image not only when the subject to be shot moves, but also when the camera operation is performed are classified into a parallel movement in which the movement vectors of the same size exist respectively in a horizontal direction and a vertical direction as shown in FIG. 5A and FIG. 5B and a radial movement in which the focal point of a camera is respectively zoomed in or zoomed out and the radial movement vectors of the same size are present as shown in FIG. 5C and FIG. 5D.

Figure 6:
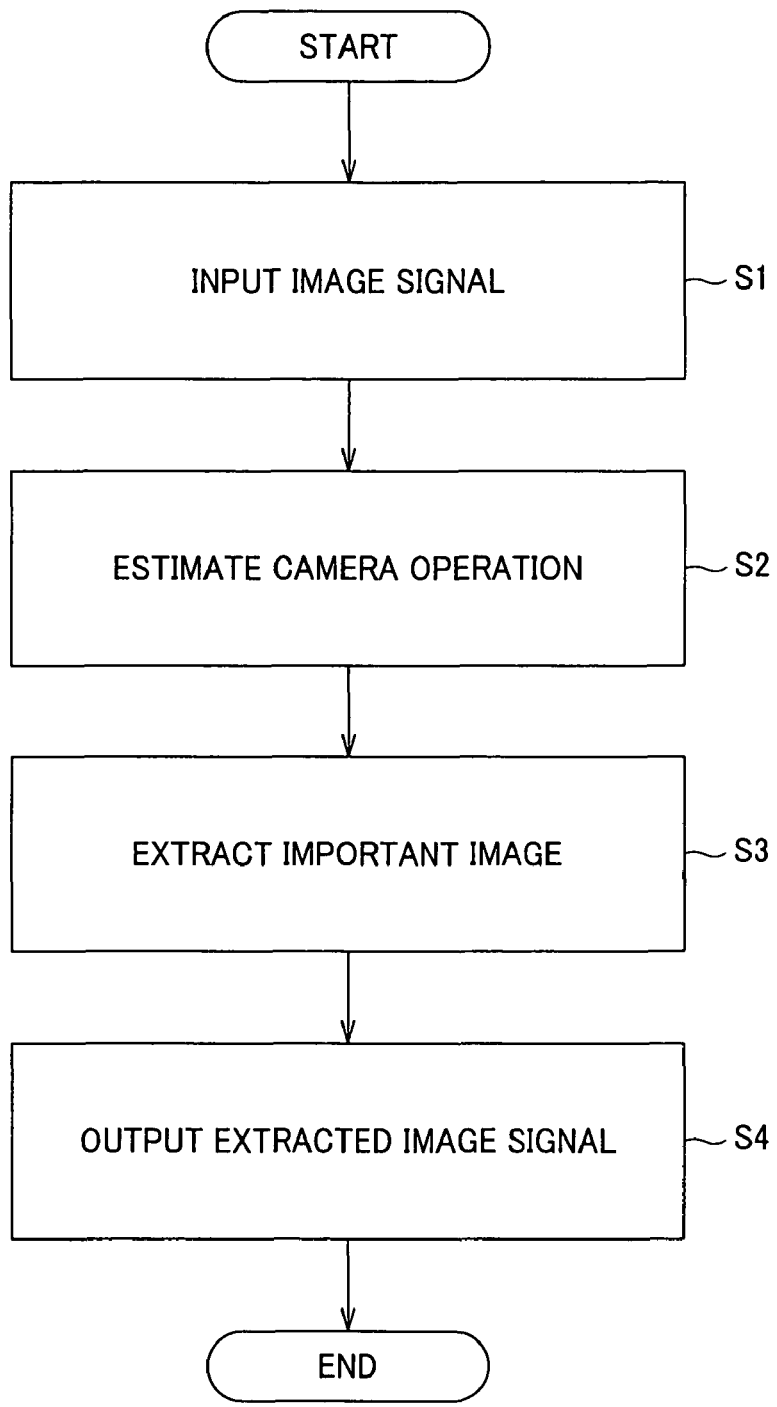
FIG. 6 is a flow chart for explaining the procedure of an entire image signal process.

Firstly, the procedure of all image signal processes will be described by using a flow chart shown in FIG. 6. Initially, in step S1, the image signal is inputted. In step S2, the camera operation such as the panning operation, the tilting operation, the zooming operation, etc. upon shooting is estimated. Then, in step S3, the image estimated to be an important image is extracted from the estimated camera operation. In step S4, the extracted image is outputted.

Figure 7:
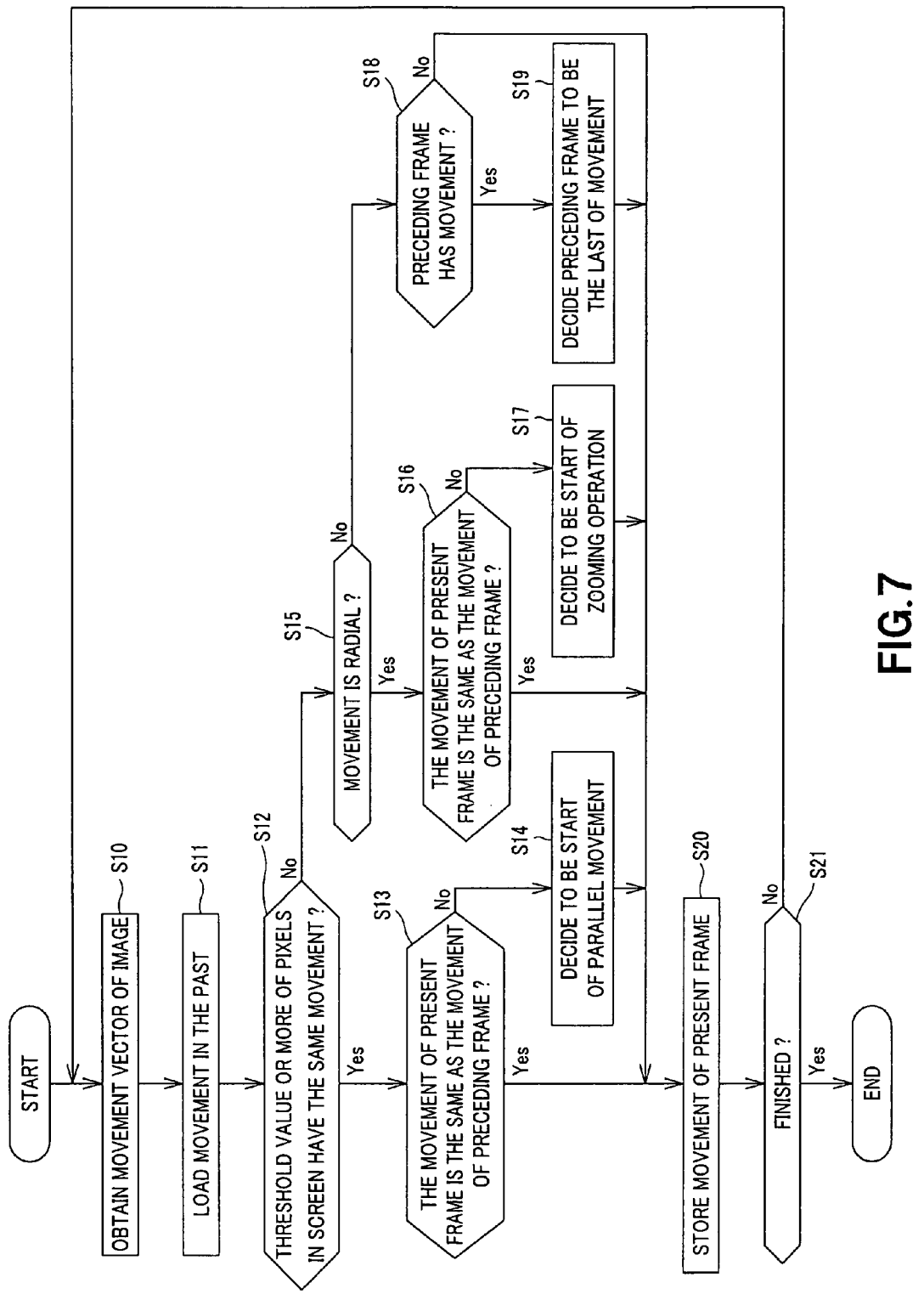
FIG. 7 is a flow chart for explaining the procedure of an estimating process of the camera operation.

Subsequently, the procedure of the estimating process of the camera operation will be described by using a flow chart shown in FIG. 7. Firstly, in step S10, the movement vector of the input image is detected. In step S11, a movement in the past is loaded. Here, the movement in the past indicates the direction of the lastly detected movement vector.

Then, in step S12, it is discriminated whether or not there are a threshold value or more of pixels having the movement vectors in the same direction in a screen, among pixels of an image for a frame unit, for instance, pixels in a screen. When the threshold value or more of the pixels have the movement vectors in the same direction (Yes), the process advances to step S13. When an answer is negative (No), the process advances to step S15. Here, the movement vectors in the same direction do not necessarily correspond to the completely same direction. The movement vectors located within a prescribed range may be determined to be the movement vectors in the same direction. The following the same.

In the step S13, whether or not the movement of a present frame is the same as the movement of a preceding frame is discriminated. When the movement of the present frame is the same as the movement of the preceding frame (Yes), the process advances to step S20. When the movement of the present frame is not the same as the movement of the preceding frame (No), it is decided to be a start of a parallel movement in step S14 and the process moves to the step S20. An image decided to be the start of the parallel movement is read from the image storage memory 4 by the image synthesizing part 7. Here, the movement of the preceding frame indicates the direction of the movement of the camera operation at least in the preceding frame. The following is the same.

Figure 8:
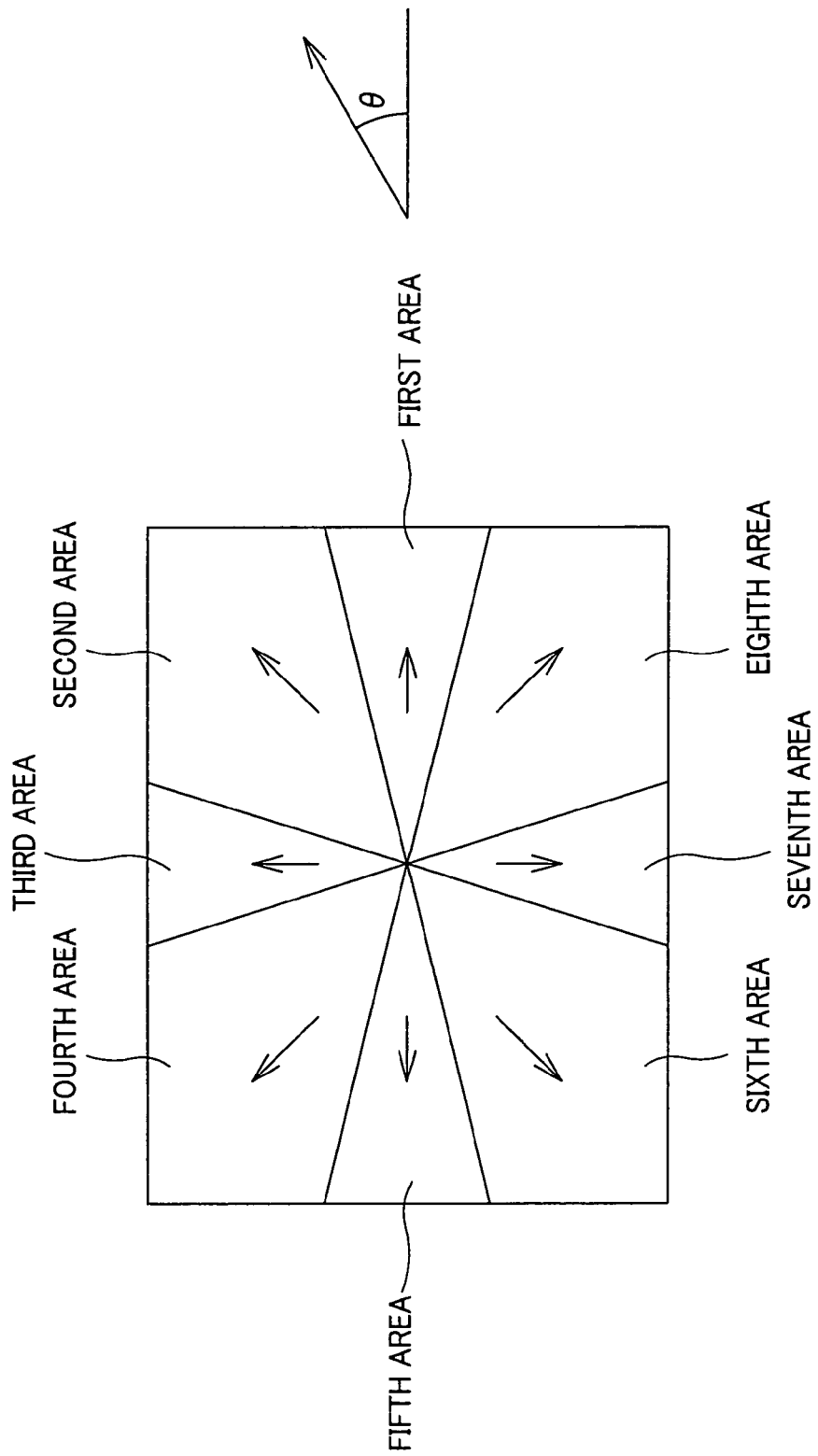
FIG. 8 is a diagram for explaining a method for discriminating the radial movement.

In the step S15, whether or not the movement vectors of the pixels in the screen are radial is decided. During the deciding operation, the screen is divided into, for instance, eight as shown in FIG. 8. Whether or not an angle $\theta$ of the movement vectors of the pixels in each area is located within a range set for each area is decided. In an example of flowing out shown in FIG. 8, the range of the angle $\theta$ can be set as described below. In an example of suction, it is to be understood that vectors in an opposite direction are obtained.

first area: $-10°<\theta<10°$, second area: $30°<\theta<60°$, third area: $80°<\theta<100°$, fourth area: $120°<\theta<150°$, fifth area: $170°<\theta<190°$, sixth area: $210°<\theta<240°$, seventh area: $260°<\theta<280°$, eighth area: $300°<\theta<320°$.

Then, the angle of the movement vectors of the pixels in each area is compared with the threshold value to discriminate whether or not the movement vectors of the pixels have radial movements. In the step S15, when the movement vectors have the radial movements (Yes), the process advances to step S16. When the movement vectors do not have the radial movements (No), the process advances to step S18.

In the step S16, whether or not the movement of the present frame is the same as the movement of the preceding frame is discriminated. When the movement of the present frame is the same as the movement of the preceding frame (Yes), the process advances to the step S20. When the movement of the present frame is not the same as the movement of the preceding frame (No), it is decided to be a start of a zooming movement in step S17 and the process moves to the step S20. An image decided to be the start of the zooming movement is read from the image storage memory 4 by the image synthesizing part 7.

In the step S18, it is discriminated whether or not there is the parallel movement in the preceding frame or whether or not there is the zooming movement in the preceding frame. When there is no movement (No), the process advances to the step S20. When there is the movement (Yes), the image of the preceding frame is decided to be the last movement in step S119 and the process moves to the step S20. The image decided to be the last movement is read from the image storage memory 4 by the image synthesizing part 7.

Subsequently, in the step S20, the movement of the present frame is stored. In next step S21, whether or not the estimating process of the camera operation is finished is discriminated. When the estimating process is not finished (No), the process returns to the step S10 to continue the process.

As described above, the camera operation estimating part 3 detects the movement vector of the supplied input image to estimate the camera operations, for instance, the panning operation in the horizontal direction, the tilting operation in the vertical direction, the zooming operation such as the zooming-in operation, the zooming-out operation, etc. from the movement vector.

Figure 9A:
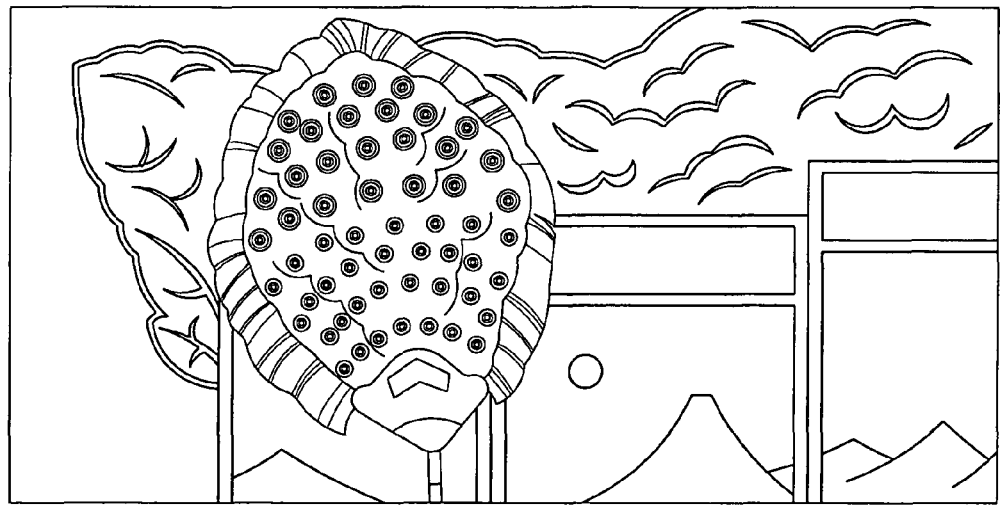
FIGS. 9A and 9B are diagrams showing the specific examples of important images.
Figure 9B:
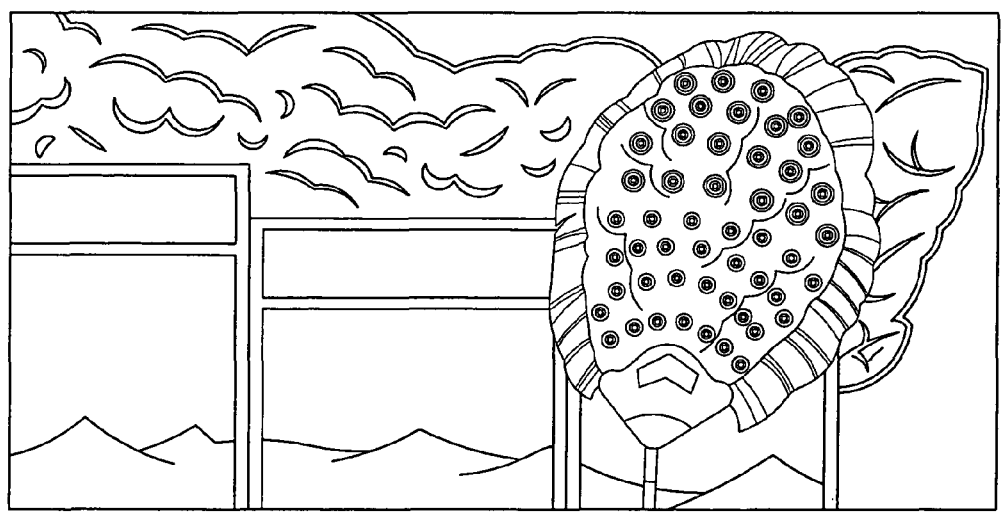
Figure 10A:
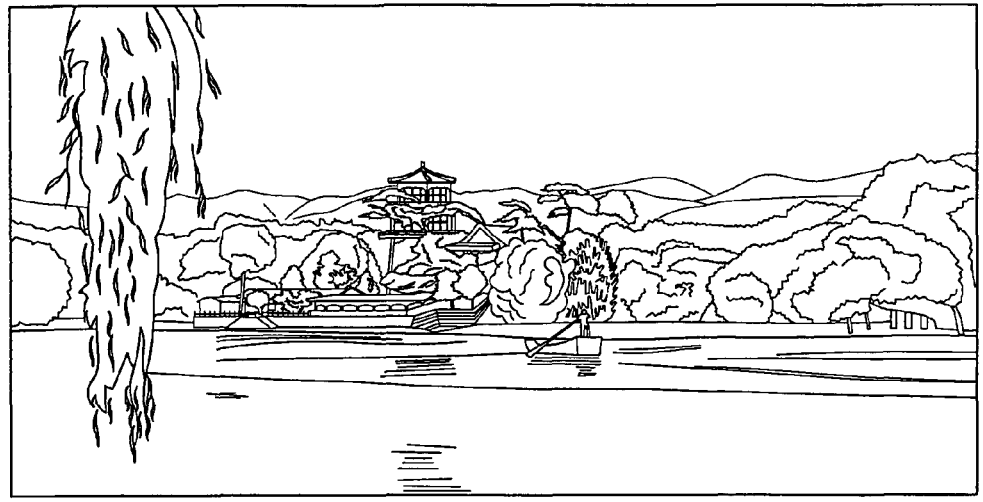
FIGS. 10A and 10B are diagrams showing specific examples of important images.
Figure 10B:
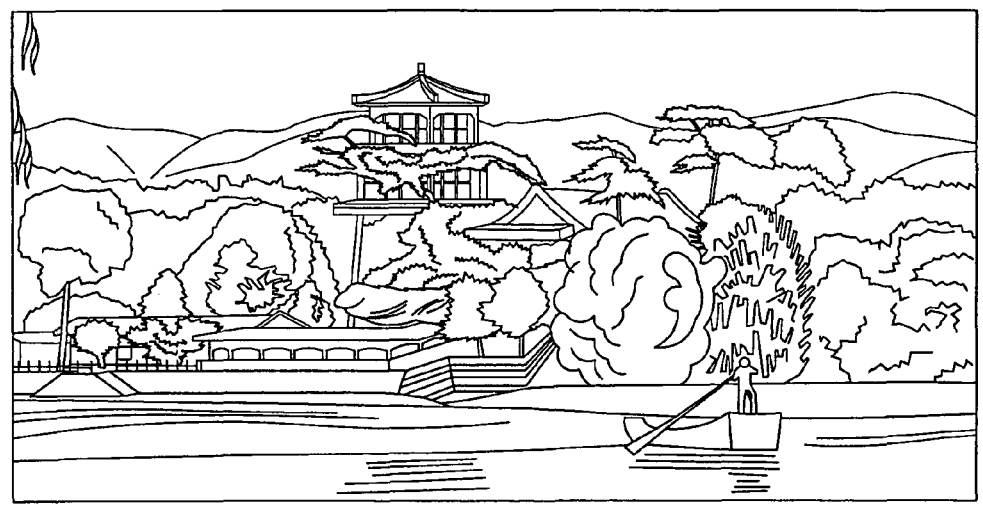

The image synthesizing part 7 shown in FIG. 4 reads out the image decided to be the start time or the completion time of the camera operation by the camera operation estimating part 3 from the image storage memory 4, holds and reduces the image to synthesize the reduced image with the input image. For instance, the image at the time of start of the panning operation and the image at the time of completion of the panning operation are respectively shown in FIGS. 9A and 9B. Further, the image at the time of start of the zooming operation and the image at the time of completion of the zooming operation are respectively shown in FIGS. 10A and 10B.

The image output part 5 outputs the synthesized image obtained in such a way and displays the synthesized image on a display means that is not shown in the drawings.

As described above, the image signal processor 1 in this embodiment detects the movement vector of the input image to estimate the camera operations, for instance, the panning operation in the horizontal direction, the tilting operation in the vertical direction, the zooming operation such as the zooming-in operation, the zooming-out operation, etc. from the movement vector. Then, the image signal processor 1 displays the images before and after the camera operation together with an image that is currently broadcast by, for instance, dividing the screen. Thus, the viewer can easily grasp the space to be shot and can be prevented from overlooking the image estimated to be important.

A series of processes described above can be performed by a hardware, however, may be performed by a software. When the series of processes are executed by the software, a program forming the software is installed from a recording medium in a computer incorporated in a dedicated hardware or a general purpose personal computer in which various kinds of functions can be performed by installing various kinds of programs.

In the above-description, the images before and after the camera operation are displayed together with the image that is currently broadcast by, for instance, dividing the screen. However, when a plurality of display means is provided, the images before and after the camera operation can be displayed separately from the image that is currently broadcast.

Now, an image signal processing system having the plurality of display means as described above will be described below. An image signal processing system of this embodiment includes an image signal processor for extracting an important image from an inputted image signal and a plurality of display devices for displaying the extracted important image or the input image.

The image signal processor may be prepared for each of the display devices for displaying the important images, or the important image extracted by one image signal processor may be supplied to each of the display devices. A case that the image signal processor is provided for each of the display devices for displaying the important images will be described and referred to as a distributed type. A case that the one image signal processor supplies the important image respectively to the plurality of the display devices will be described and referred to as an integrated type, hereinafter.

Firstly, the schematic structure of the distributed type image signal processing system in this embodiment is shown in FIG. 11. As shown in FIG. 11, in the distributed type image signal processing system 100, each of image processors 30a to 30c for extracting an important image from an input image is connected to each of display devices 40a to 40c.

Figure 12:
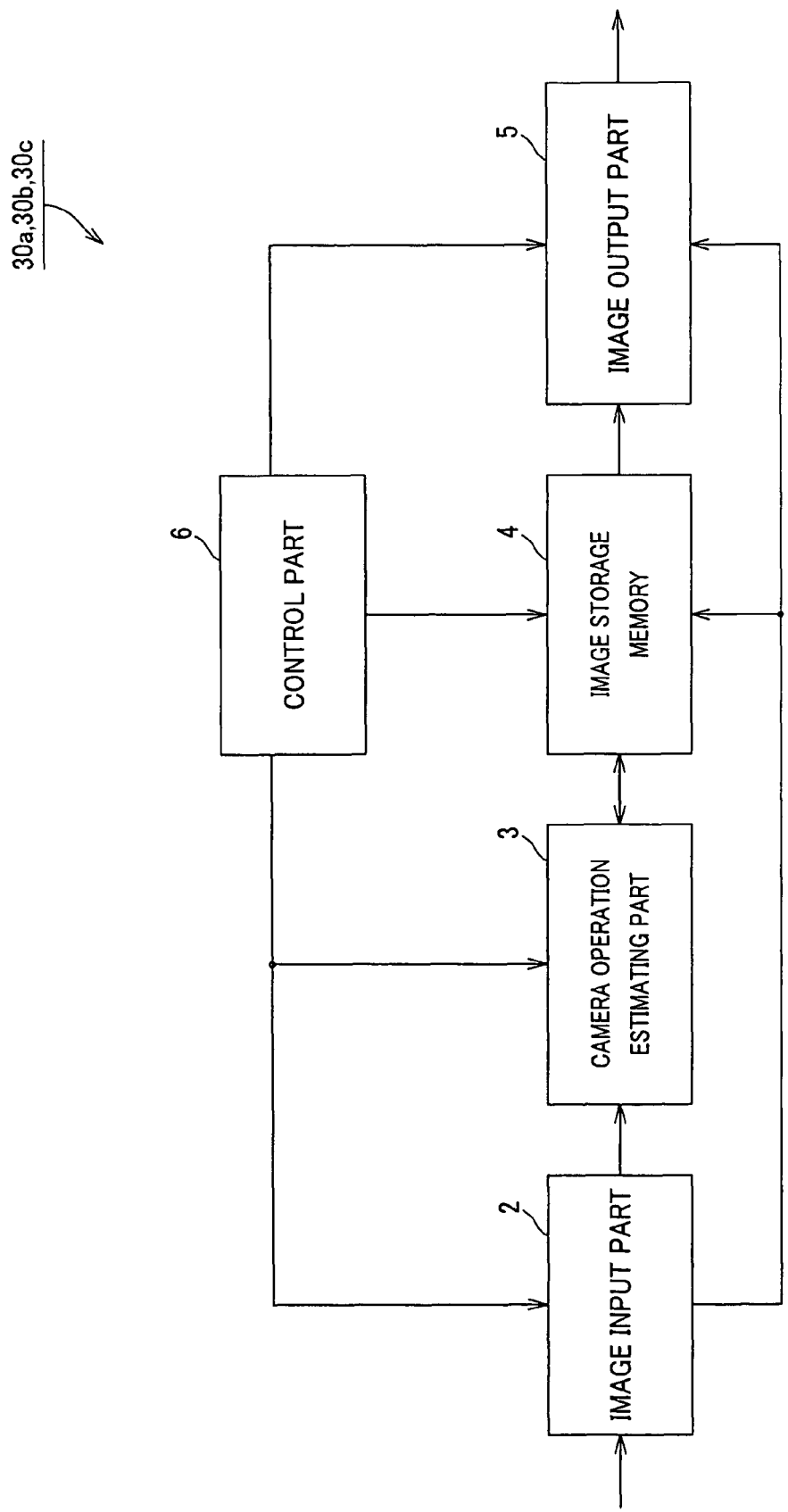
FIG. 12 is a diagram for explaining the schematic structure of an image signal processor in the distributed type image signal processing system.

The schematic structure of each of the image signal processors 30a to 30c is shown in FIG. 12. As shown in FIG. 12, since the basic structure of each of the image signal processors 30a to 30c is the same as that of the image signal processor 1 shown in FIG. 1, the same structures as those of the image signal processor 1 are designated by the same reference numerals and the detailed description thereof is omitted. Briefly stated, a camera operation estimating part 3 detects the movement vector of a supplied input image to estimate, for instance, a panning operation in a horizontal direction, a tilting operation in a vertical direction, a zooming operation such as a zooming-in operation, a zooming-out operation, etc. from the movement vector. Then, an image output part 5 reads and outputs an image decided to be the start time of a camera operation or an image decided to be the completion time of a camera operation by the camera operation estimating part 3 from an image storage memory 4, or outputs an input image supplied from an image input part 2.

The display devices 40a to 40c respectively display images outputted from the image signal processors 30a to 30c before and after the camera operation or the input image.

Figure 13:
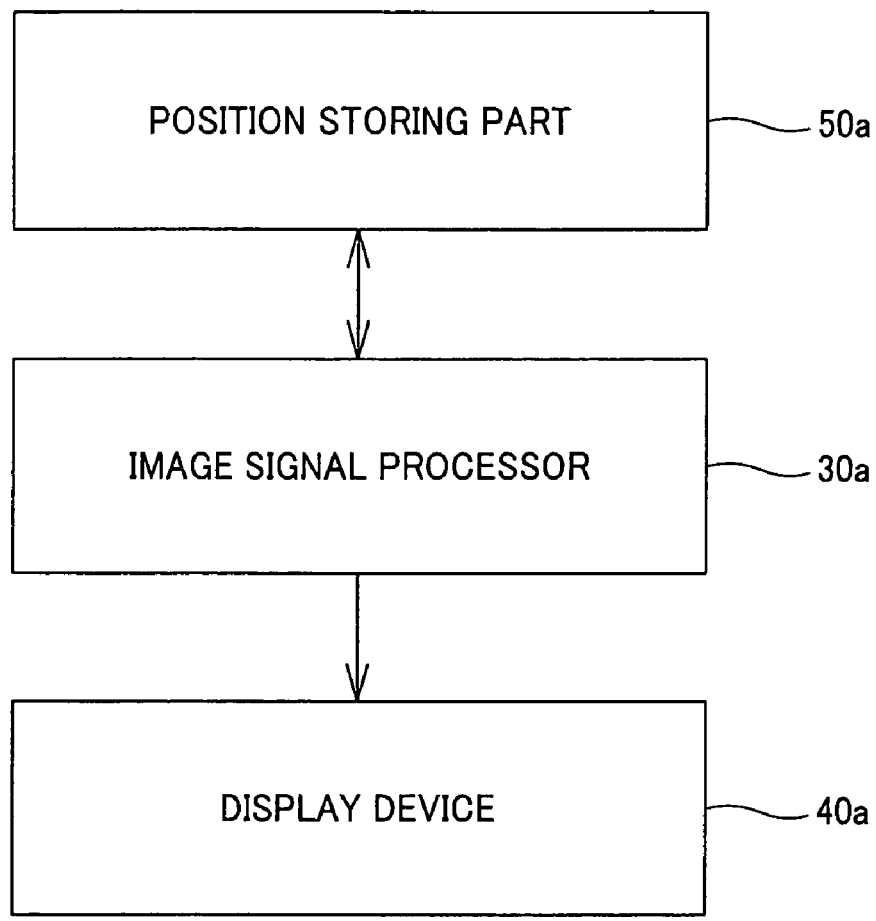
FIG. 13 is a diagram showing a state that a position storing part is provided in a pre-stage of each image signal processor in the distributed type image signal processing system.

Here, in the distributed type image signal processing system 100, each of the image signal processors 30a to 30c are independently arranged. Accordingly, as shown in FIG. 13, each of position storing parts 50a to 50c for storing relative positions is provided in a pre-stage of each of the image signal processors 30a to 30c. The relative position may be manually inputted upon setting, or may be automatically detected by a communication between the image signal processors 30a to 30c.

As described below, the relative positions are used to determine what important images are respectively supplied to the display devices 40a to 40c by the image signal processors 30a to 30c.

Figure 14:
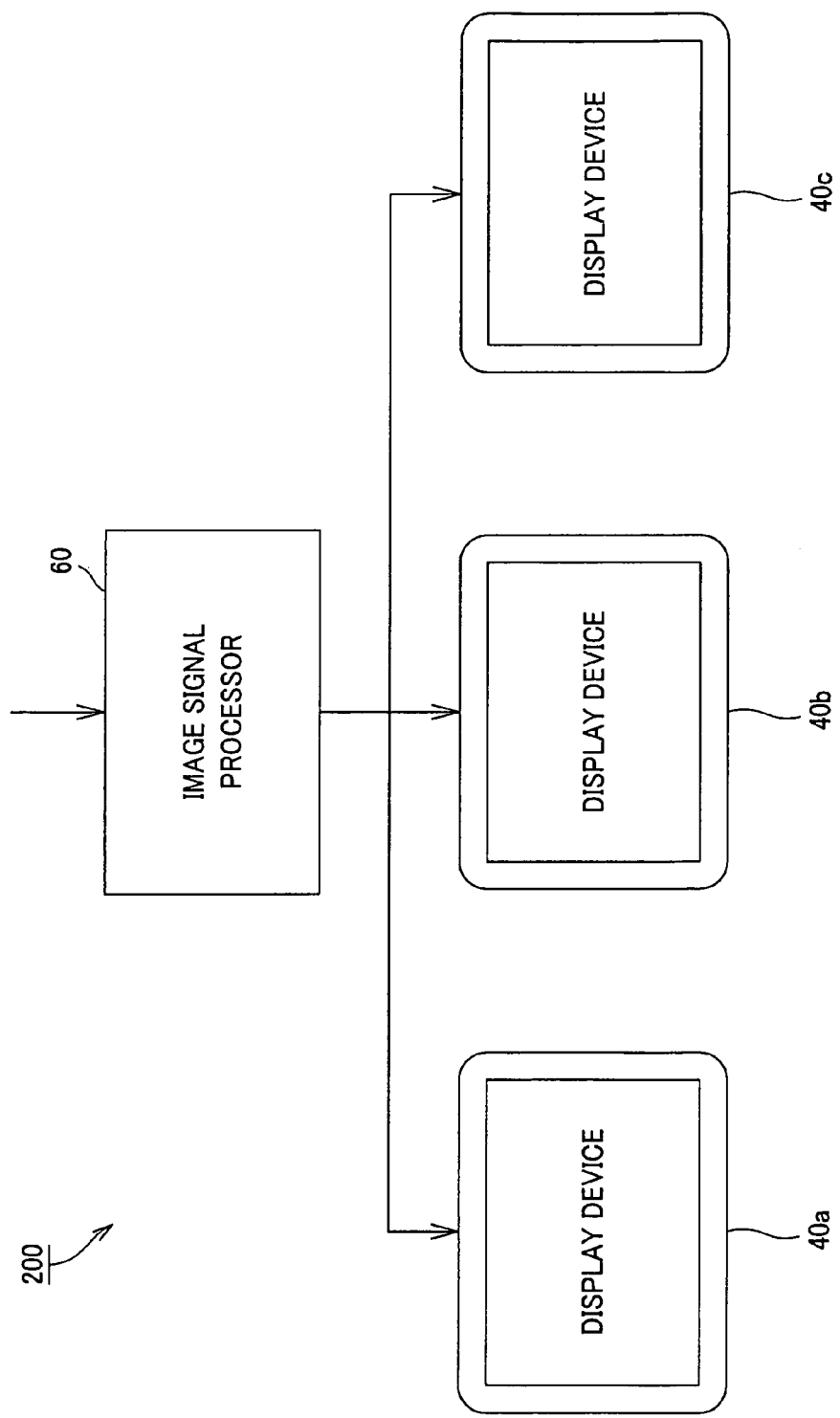
FIG. 14 is a diagram for explaining the schematic structure of an integrated type image signal processing system in this embodiment.

Now, the schematic structure of an integrated type image signal processing system in this embodiment is shown in FIG. 14. As shown in FIG. 14, in the integrated type image signal processing system 200, a plurality of display devices 40a to 40c are connected to an image signal processor 60 for extracting a plurality of important images from an input image.

Figure 15:
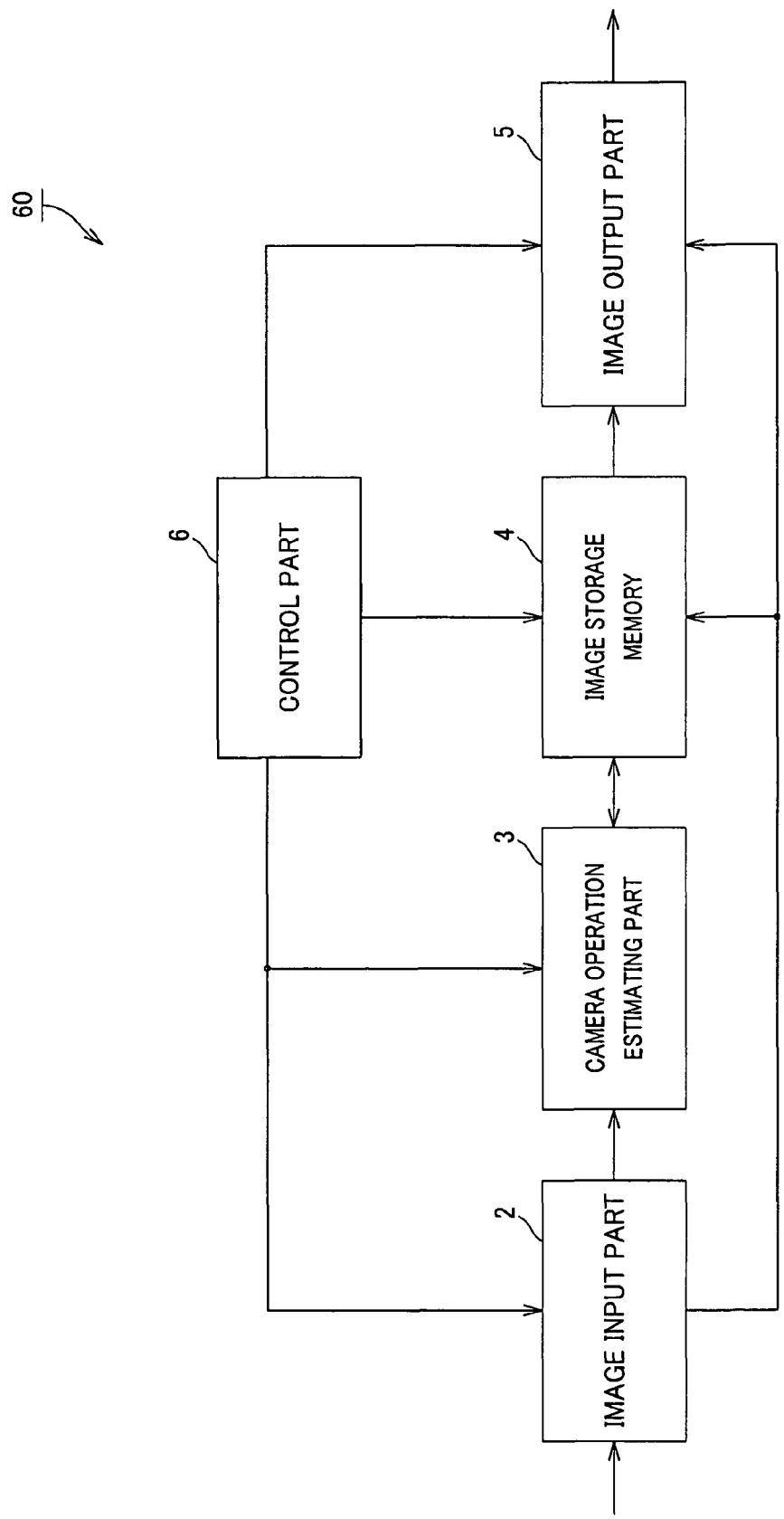
FIG. 15 is a diagram for explaining the schematic structure of an image signal processor in the integrated type image signal processing system.

The schematic structure of the image signal processor 60 is shown in FIG. 15. As shown in FIG. 15, since the basic structure of the image signal processor 60 is the same as that of the image signal processor 1 shown in FIG. 1, the same structures as those of the image signal processor 1 are designated by the same reference numerals and the detailed description thereof is omitted. Briefly stated, a camera operation estimating part 3 detects the movement vector of a supplied input image to estimate, for instance, a panning operation in a horizontal direction, a tilting operation in a vertical direction, a zooming operation such as a zooming-in operation, a zooming-out operation, etc. from the movement vector. Then, an image output part 5 reads an image decided to be the start time of a camera operation or an image decided to be the completion time of a camera operation by the camera operation estimating part 3 from an image storage memory 4 and outputs the image together with an input image supplied from an image input part 2.

The display devices 40a to 40c display images outputted from the image signal processor 60 before and after the camera operation or the input image.

Figure 16:
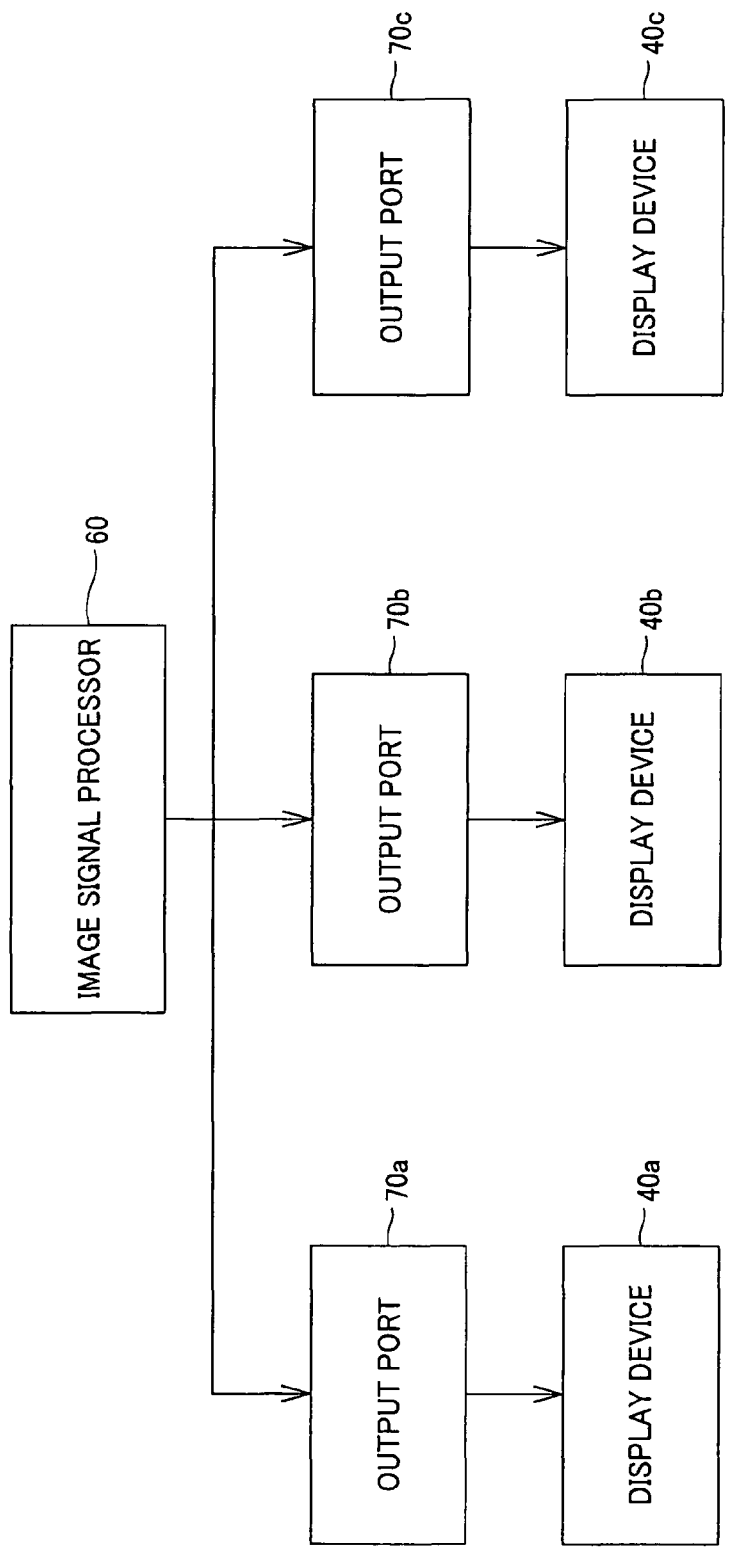
FIG. 16 is a diagram showing a state that a display device is connected to each output port in the integrated type image signal processing system.

Here, in the integrated type image signal processing system 200, as shown in FIG. 16, it is determined what important images are respectively supplied to the display devices 40a to 40c by the image signal processor 60 depending on which of the display devices 40a to 40c is connected to which of output ports 70a to 70c.

When a plurality of display devices are present, the characteristics of an image are associated with the arrangement of the display devices and displayed so that an audio-visual effect can be improved.

Figure 17:
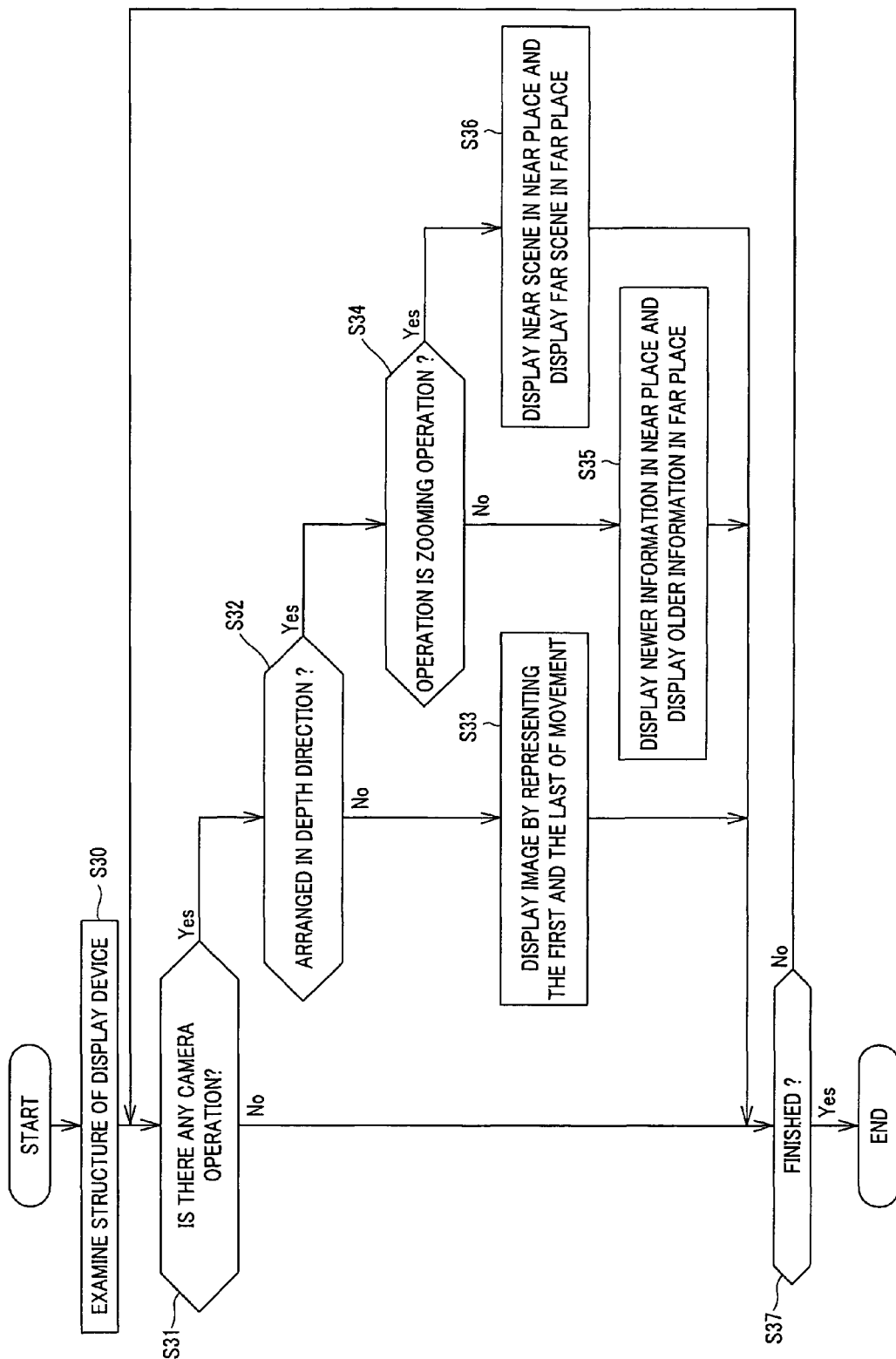
FIG. 17 is a flow chart for explaining the procedure of the image signal processing system when the characteristics of an image are associated with the arrangement of the display devices and displayed.
Figure 18B:
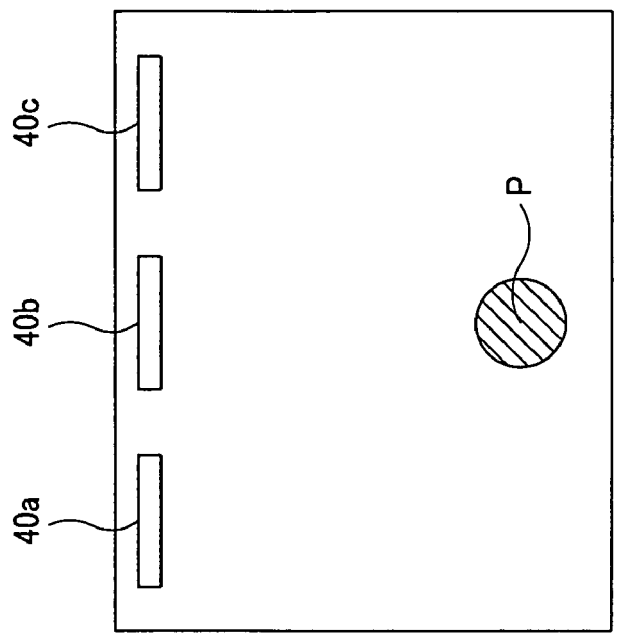
FIGS. 18A and 18B are diagrams showing arrangement examples of a plurality of display devices.
Figure 18A:
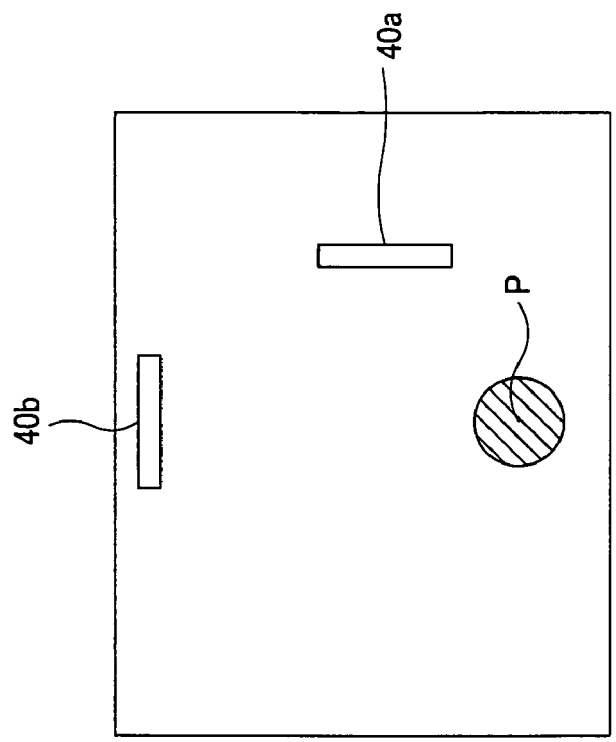

The procedure of an image display system in this case is described by using a flow chart shown in FIG. 17. Firstly, in step S30, the arrangement of the display devices is examined. As an example of the arrangement, for instance, an interior arrangement as shown in FIG. 18A or a parallel arrangement as shown in FIG. 18B may be exemplified. The illustration of the display device for displaying an ordinary input image is omitted in FIGS. 18A and 18B.

In the interior arrangement shown in FIG. 18A, the display devices 40a and 40b on which the important images are respectively displayed are arranged at two positions near to and remote from a viewer P. The near position or the remote position can be detected by measuring a distance from a remote controller using, for instance, a stereoscopic measurement. Further, in the parallel arrangement shown in FIG. 18B, the display devices 40a, 40b and 40c on which the important images are respectively displayed are arranged at three positions in the horizontal direction relative to the viewer P. In the parallel arrangement, the display devices may be arranged leastwise at two positions in the vertical direction relative to the viewer P.

Then, in step S31, whether or not the camera operation is detected is discriminated. When the camera operation is detected (Yes), the process advances to step S32. When the camera operation is not detected (No), the process advances to step S37.

Subsequently, in the step S32, whether or not the arrangement of the display devices is the interior arrangement is discriminated. When the arrangement of the display devices is not the interior arrangement (No), that is, the arrangement is the parallel arrangement, an image at the time of start of the movement and an image at the time of completion of the movement are displayed by representing the movement in step S33. For instance, when the two display devices for displaying the important images are provided at right and left sides and the camera operation is the panning operation from the left to the right, the image at the time of start of the panning operation is displayed on the display device in the left side and the image at the time of completion of the panning operation is displayed on the display device in the right side. Further, when the two display devices for displaying the important images are provided in upper and lower parts and the camera operation is the tilting operation from the lower part to the upper part, the image at the time of start of the tilting operation is displayed on the lower display device and the image at the completion of the tilting operation is displayed on the upper display device. On the other hand, in the step S32, when the arrangement of the display devices is the interior arrangement (Yes), the process advances to step S34.

In the step S34, whether or not the camera operation is the zooming operation is discriminated. When the camera operation is not the zooming operation (No), that is, the camera operation is the panning operation, or the tilting operation, a newer image is displayed on the display device near to a viewer and an older image is displayed on the display device remote from the viewer in step S35. On the other hand, in the step S34, when the camera operation is the zooming operation (Yes), a near scene is displayed on the display device near to the viewer and a remote scene is displayed on the display device remote from the viewer in step S36.

In the step S37, a completion is decided. When the completion is not decided, the process returns to the step S31 to continue the process.

As described above, the distributed type image signal processing system 100 and the integrated type image signal processing system 200 in this embodiment detect the movement vector of the input image to estimate, for instance, the panning operation in the horizontal direction, the tilting operation in the vertical direction, the zooming operation such as the zooming-in operation, the zooming-out operation, etc. from the movement vector. Then, the image signal processing systems display the images before and after the camera operation on the display devices separate from the display device on which an image that is currently broadcast is displayed. Thus, the viewer can easily grasp a space to be shot and can be prevented from overlooking the image estimated to be important.

Further, the left image on the image is displayed on the left display device relative to the viewer and the upper image is displayed on the upper display device relative to the viewer. The characteristics of the images are associated with the arrangement of the display devices and displayed as described above, so that an audio-visual effect can be improved.

It is to be understood by a person with ordinary skill in the art that the present invention is not limited to the above-described embodiments explained by referring to the drawings and various changes, substitutions or equivalence thereto may be made without departing attached claims and the gist thereof.

For instance, in the above-described embodiments, a natural image is used as an example and the camera operation is estimated from the movement vector. However, the image is not limited to the natural image, and the image may be likewise applied to an artificial image such as animation by assuming a virtual camera.

Further, in the above-described embodiments, the structure of hardware is mentioned, however, the present invention is not limited thereto. An arbitrary process may be realized by performing a computer program by a control part. In this case, the computer program may be stored and provided in a recording medium. Further, the computer program may be transmitted and provided through Internet or other transmitting medium.

Now, the program or the recording medium will be described below.

Figure 19:
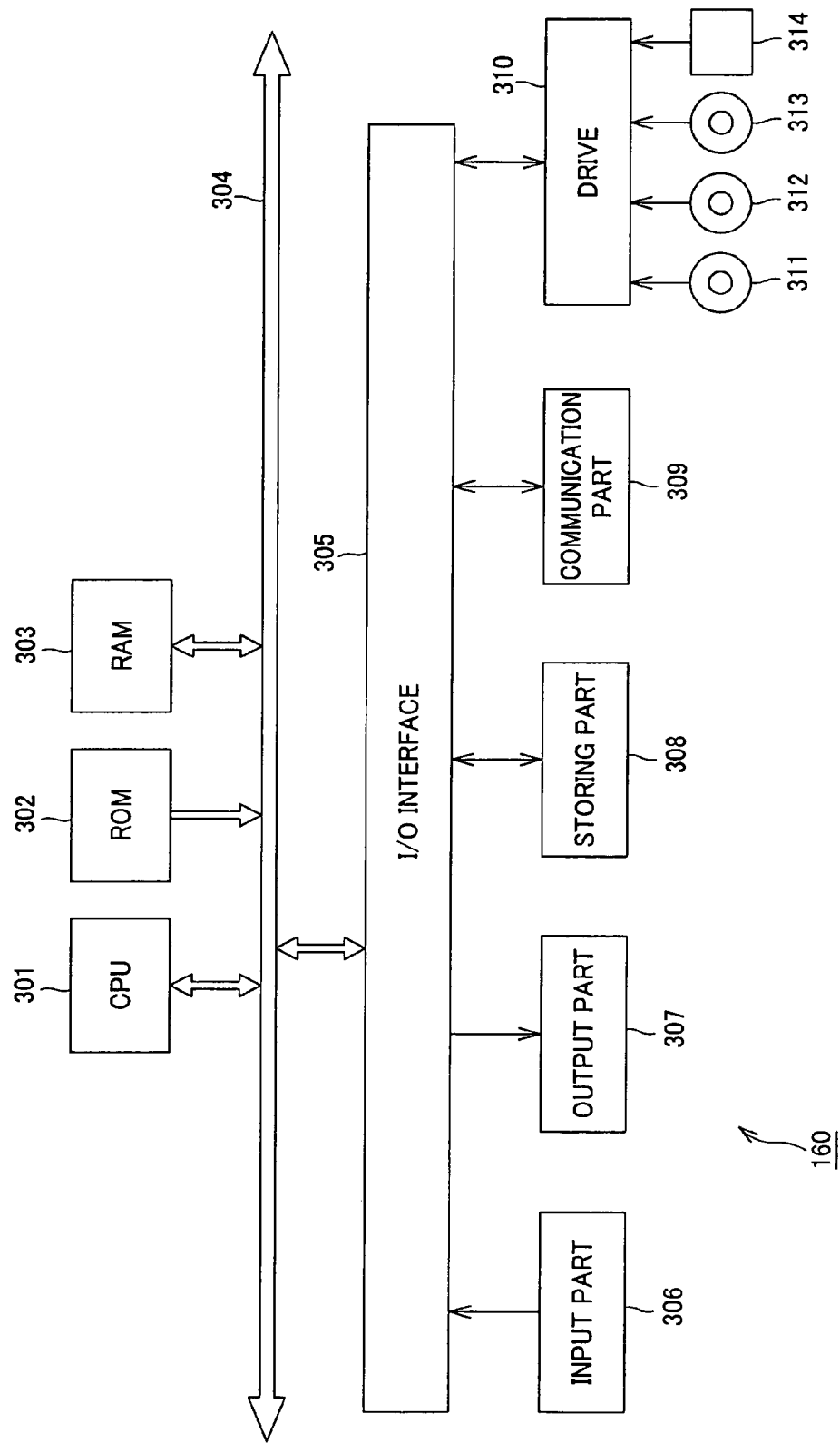
FIG. 19 is a diagram showing one example of a schematic structure of a personal computer when the image signal processor is realized by software.

One example of the schematic structure of a personal computer when the image signal processors are respectively realized by software is shown in FIG. 19. A CPU (Central Processing Unit) 301 of the personal computer controls all operations of the personal computer. Further, when a command is inputted from an input part 306 composed of a keyboard or a mouse by a user through a bus 304 and an Input/Output (I/O) interface 305, the CPU 301 executes a program stored in a ROM (Read Only Memory) 302 correspondingly thereto. Otherwise, the CPU 301 loads a program read from a magnetic disc 311, an optical disc 312, a magneto-optical disc 313 or a semiconductor memory 314 connected to a drive 310 and installed in a storing part 308 in a RAM (Random Access Memory) 303 and executes the program. Thus, the functions of the above-described image signal processors are realized by the software. Further, the CPU 301 controls a communication part 309 to communicate with an external part and transmit and receive data.

The recording medium is formed not only with a package media including the magnetic disc 311 (including a flexible disc), the optical disc 312 (including a CD-ROM (Compact Disc-Read Only Memory) and a DVD (Digital Versatile Disc)), the magneto-optical disc 313 (including an MD (Mini-Disc)) or the semiconductor memory 314 in which the program distributed to provide the program to the user is recorded, separately from the computer as shown in FIG. 19, but also with the ROM 302 provided to the user under a previously incorporated state in the computer and having the program recorded or a hard disc included in the storing part 308 or the like.

In this specification, it is to be understood that the steps for describing the program recorded in the recording medium include not only processes carried out in time series in accordance with a described sequence, but also processes which are not necessarily carried out in time series, but are performed in parallel or individually.

INDUSTRIAL APPLICABILITY

According to the present invention, the movement vector of the input image is detected. For instance, the panning operation in the horizontal direction, the tilting operation in the vertical direction, the zooming operation such as the zooming-in operation, the zooming-out operation, etc. are estimated from the movement vector. Then, the images before and after the camera operation are synthesized with the input image to display the synthesized image on the display means, or display the synthesized image on the display means separate from the display means for displaying the input image. Thus, the image considered to be important is prevented from being overlooked. Further, when a plurality of display devices are provided, the characteristics of the images are associated with the arrangement of the display devices and displayed, so that an audio-visual effect can be improved.

The invention claimed is:

1. An image signal processor comprising:

an input means for inputting an image signal;

a camera operation estimating means for estimating a start time and/or a completion time of a camera operation from a movement detected in the inputted image signal and extracting the image signal at the estimated start time and/or the estimated completion time of the camera operation, the camera operation estimating means comprising:

a movement detecting means for detecting the movement of the inputted image signal on the basis of movement vectors of pixels corresponding to the inputted image signal; and a second memory for storing previously determined movement, wherein the start time and/or the completion time of the camera operation are decided on the basis of the determined movement of the inputted image signal and an output from the second memory such that:

if the output from the second memory is different from the movement of the inputted image signal and the output indicates no movement, then the start time of the camera operation is estimated, and, if the output from the second memory is different from the movement of the inputted image signal and the output indicates a movement, then the completion time of the camera operation is estimated; and an output means for outputting the extracted image signal.

2. The image signal processor according to claim 1, wherein the inputted image signal is composed of frame units.

3. The image signal processor according to claim 1, further comprising a first memory for storing the inputted image signal, wherein the camera operation estimating means extracts the image signal at the estimated start time and/or the estimated completion time of the camera operation from the first memory.

4. The image signal processor according to claim 1, wherein the camera operation estimating means further includes a movement vector number deciding means for deciding a movement vector number for each of the movement vectors obtained from the inputted image signal to determine a movement associated with the camera operation.

5. The image signal processor according to claim 1, wherein the movement is determined on the basis of the movement vectors of pixels for each frame unit of the inputted image signal.

6. The image signal processor according to claim 1, wherein the previously determined movement is a last detected movement vector.

7. The image signal processor according to claim 1, wherein the movement indicates a direction in which the camera operation moves.

8. The image signal processor according to claim 1, wherein the camera operation indicates a panning operation in a horizontal direction or a tilting operation in a vertical direction, the horizontal and vertical movement comprising parallel movement, and when a threshold value is reached or more pixels have movement vectors in the same direction, the camera operation estimating means estimates the camera operation to be the start of the parallel movement.

9. The image signal processor according to claim 1, wherein the camera operation is a zooming operation and when the movement vectors are radial, the camera operation estimating means estimates it to be the zooming operation.

10. The image signal processor according to claim 1, wherein the output means outputs the inputted image signal together with the extracted image signal.

11. The image signal processor according to claim 10, further comprising a synthesizing means for synthesizing the extracted image signal with the inputted image signal, wherein the output means outputs a synthesized image synthesized by the synthesizing means.

12. The image signal processor according to claim 11, further comprising a display means for displaying the synthesized image.

13. An image signal processing method, executed by an image signal processor, the method comprising:

an input step of inputting, by image input part, an image signal;

a camera operation estimating step of estimating a start time and/or a completion time of a camera operation, by a camera operation estimating part, from a movement detected in the inputted image signal and extracting the image signal at the estimated start time and/or the estimated completion time of the camera operation, the camera operation estimating step comprising:

a movement detecting step for detecting the movement of the inputted image signal on the basis of movement vectors of pixels corresponding to the inputted image signal; and a storing step for storing previously determined movement, wherein the start time and/or the completion time of the camera operation are decided on the basis of the determined movement of the inputted image signal and an output generated based on the storing step such that:

if the generated output is different from the movement of the inputted image signal and the output indicates no movement, then the start time of the camera operation is estimated, and, if the generated output is different from the movement of the inputted image signal and the output indicates a movement, then the completion time of the camera operation is estimated; and an output step of outputting, by an image output part, the extracted image signal.

14. A recording medium capable of being read by a computer on which a program for performing a prescribed process by the computer is recorded; said program comprising:

an input step of inputting an image signal;

a camera operation estimating step of estimating a start time and/or a completion time of a camera operation from a movement detected in the inputted image signal and extracting the image signal at the estimated start time and/or the estimated completion time of the camera operation, the camera operation estimating step comprising:

a movement detecting step for detecting the movement of the inputted image signal on the basis of movement vectors of pixels corresponding to the inputted image signal; and a storing step for storing previously determined movement, wherein the start time and/or the completion time of the camera operation are decided on the basis of the determined movement of the inputted image signal and an output generated based on the storing step such that:

if the generated output is different from the movement of the inputted image signal and the output indicates no movement, then the start time of the camera operation is estimated, and, if the generated output is different from the movement of the inputted image signal and the output indicates a movement, then the completion time of the camera operation is estimated; and an output step of outputting the extracted image signal.

15. An image signal processing system comprising:

an image signal processor including an input means for inputting an image signal;

a camera operation estimating means for estimating a start time and/or a completion time of a camera operation from a movement detected in the inputted image signal and extracting the image signal at the estimated start time and/or the estimated completion time of the camera operation, the camera operation estimating means comprising:

a movement detecting means for detecting the movement of the inputted image signal on the basis of movement vectors of pixels corresponding to the inputted image signal; and a second memory for storing previously determined movement, wherein the start time and/or the completion time of the camera operation are decided on the basis of the determined movement of the inputted image signal and an output from the second memory such that:

if the output from the second memory is different from the movement of the inputted image signal and the output indicates no movement, then the start time of the camera operation is estimated, and, if the output from the second memory is different from the movement of the inputted image signal and the output indicates a movement, then the completion time of the camera operation is estimated; and an output means for outputting the extracted image signal and a plurality of display devices for displaying the inputted image signal and the extracted image signal.

16. The image signal processing system according to claim 15, wherein the image signal processor controls an image signal displayed on each of the display devices from the extracted image signal in accordance with the arrangement of the plurality of display devices.

17. An image signal processor comprising:

an input part for inputting an image signal;

a camera operation estimating part for estimating a start time and/or a completion time of a camera operation from a movement detected in the inputted image signal and extracting the image signal at the estimated start time and/or the estimated completion time of the camera operation, the camera operation estimating part comprising:

a movement detecting part for detecting the movement of the inputted image signal on the basis of movement vectors of pixels corresponding to the inputted image signal; and a second memory for storing previously determined movement, wherein the start time and/or the completion time of the camera operation are decided on the basis of the determined movement of the inputted image signal and an output from the second memory such that:

if the output from the second memory is different from the movement of the inputted image signal and the output indicates no movement, then the start time of the camera operation is estimated, and, if the output from the second memory is different from the movement of the inputted image signal and the output indicates a movement, then the completion time of the camera operation is estimated; and an output part for outputting the extracted image signal.

18. The image signal processor according to claim 17, wherein the inputted image signal is composed of frame units.

19. The image signal processor according to claim 17, further comprising a first memory for storing the inputted image signal, wherein the camera operation estimating part extracts the image signal at the estimated start time and/or the estimated completion time of the camera operation from the first memory.

20. The image signal processor according to claim 17, wherein the camera operation estimating part further includes a movement vector number deciding part that decides a movement vector number for each of the movement vectors obtained from the inputted image signal to determine a movement associated with the camera operation.

21. The image signal processor according to claim 17, wherein the movement is determined on the basis of the movement vectors of pixels for each frame unit of the inputted image signal.

22. The image signal processor according to claim 17, wherein the previously determined movement is a last detected movement vector.

23. The image signal processor according to claim 17, wherein the movement indicates a direction in which the camera operation moves.

24. The image signal processor according to claim 17, wherein the camera operation indicates a panning operation in a horizontal direction or a tilting operation in a vertical direction, the horizontal and vertical movement comprising parallel movement, and when a threshold value is reached or more pixels have movement vectors in the same direction, the camera operation estimating means estimates the camera operation to be the start of the parallel movement.

25. The image signal processor according to claim 17, wherein the camera operation is a zooming operation and when the movement vectors are radial, the camera operation estimating means estimates it to be the zooming operation.

26. The image signal processor according to claim 17, wherein the output part outputs the inputted image signal together with the extracted image signal.

27. The image signal processor according to claim 26, further comprising a synthesizing part for synthesizing the extracted image signal with the inputted image signal, wherein the output part outputs a synthesized image synthesized by the synthesizing part.

28. The image signal processor according to claim 27, further comprising a display for displaying the synthesized image.

29. An image signal processing system comprising:

an image signal processor including an input part for inputting an image signal;

a camera operation estimating part for estimating a start time and/or a completion time of a camera operation from a movement detected in the inputted image signal and extracting the image signal at the estimated start time and/or the estimated completion time of the camera operation, the camera operation estimating part comprising:

a movement detecting part for detecting the movement of the inputted image signal on the basis of movement vectors of pixels corresponding to the inputted image signal; and a second memory for storing previously determined movement, wherein the start time and/or the completion time of the camera operation are decided on the basis of the determined movement of the inputted image signal and an output from the second memory such that:

if the output from the second memory is different from the movement of the inputted image signal and the output indicates no movement, then the start time of the camera operation is estimated, and, if the output from the second memory is different from the movement of the inputted image signal and the output indicates a movement, then the completion time of the camera operation is estimated; and an output part for outputting the extracted image signal and a plurality of display devices for displaying the inputted image signal and the extracted image signal.

\* \* \* \* \*